United States Patent
Kushnirov

(10) Patent No.: US 11,484,086 B2
(45) Date of Patent: Nov. 1, 2022

(54) MAGNETIC FASTENING DEVICE

(71) Applicant: Cardo Systems, Ltd., Ra'anana (IL)

(72) Inventor: Avram Kushnirov, Barkan (IL)

(73) Assignee: Cardo Systems, Ltd., Ra'anana (IL)

( * ) Notice: Subject to any disclaimer, the term of this patent is extended or adjusted under 35 U.S.C. 154(b) by 0 days.

(21) Appl. No.: 17/675,425

(22) Filed: Feb. 18, 2022

(65) Prior Publication Data

US 2022/0218064 A1 Jul. 14, 2022

Related U.S. Application Data

(63) Continuation of application No. PCT/IB2020/060404, filed on Nov. 5, 2020.

(51) Int. Cl.
*A42B 3/30* (2006.01)
*F16B 1/00* (2006.01)

(52) U.S. Cl.
CPC ............... *A42B 3/30* (2013.01); *F16B 1/00* (2013.01); *F16B 2001/0035* (2013.01)

(58) Field of Classification Search
CPC combination set(s) only.
See application file for complete search history.

(56) References Cited

U.S. PATENT DOCUMENTS

| | | | |
|---|---|---|---|
| 5,914,816 A * | 6/1999 | Soto | G02B 7/002 359/822 |
| 8,056,152 B2 * | 11/2011 | Brace | A42B 3/225 2/424 |
| 9,756,930 B2 * | 9/2017 | Hanchett | A45F 5/02 |
| 9,829,772 B2 * | 11/2017 | Harrison | G03B 17/561 |
| 10,021,931 B2 * | 7/2018 | Tulley | A42B 3/042 |
| 10,492,559 B1 * | 12/2019 | Kele | A42B 3/326 |
| 11,129,431 B2 * | 9/2021 | Whitesell | A42B 3/185 |
| 2006/0133068 A1 | 6/2006 | Sherring | |
| 2011/0145981 A1 * | 6/2011 | Teetzel | G02B 23/125 2/422 |
| 2014/0245523 A1 * | 9/2014 | Teetzel | G02B 23/125 2/422 |
| 2015/0286117 A1 | 10/2015 | Sung et al. | |
| 2017/0059967 A1 * | 3/2017 | Harrison | F16M 13/00 |
| 2017/0341871 A1 | 11/2017 | Peters | |
| 2020/0383417 A1 * | 12/2020 | Bohn | A42B 3/223 |
| 2022/0057173 A1 * | 2/2022 | Jacobson | F41G 11/001 |

OTHER PUBLICATIONS

International Publication No. PCT/IB2020/060404, "International Search Report and Written Opinion", dated Jul. 12, 2021, 12 pages.

* cited by examiner

*Primary Examiner* — Monica E Millner
(74) *Attorney, Agent, or Firm* — Kilpatrick Townsend & Stockton LLP

(57) ABSTRACT

A magnetic fastening device for releasably fastening a first unit and a second unit to each other, the magnetic fastening device comprising at least one pair of magnets, wherein one of the units is provided with at least one protrusion, while the other of the units is provided with at least one recess for receiving the at least one protrusion, and wherein a first magnet and a second magnet of each pair are displaced relative to each other by a displacement distance in a displacement direction such that, in a state in which the units abut against each other, a component of the attractive force maintains the at least one protrusion in the at least one recess.

20 Claims, 2 Drawing Sheets

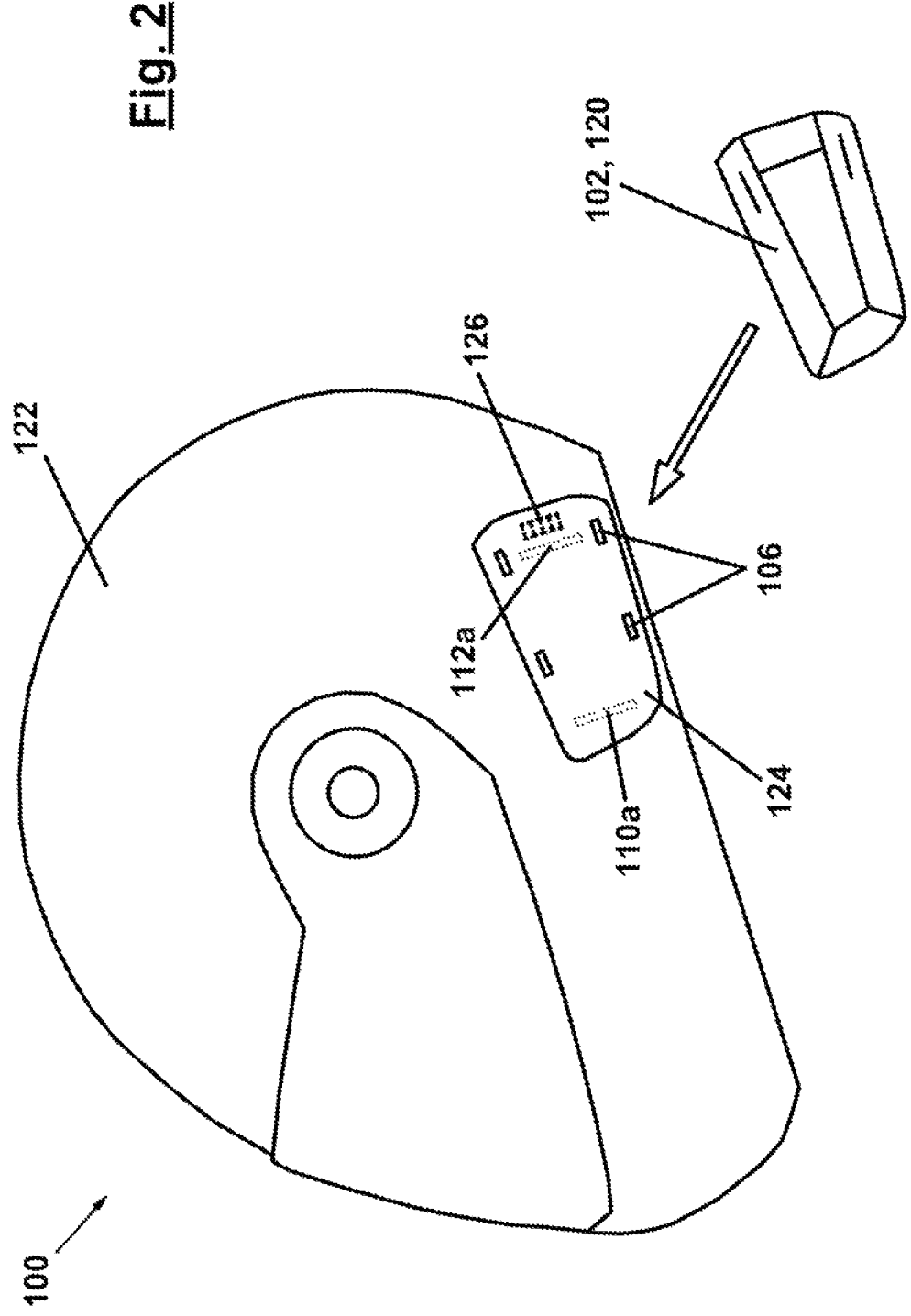

MAGNETIC FASTENING DEVICE

CROSS REFERENCE TO RELATED APPLICATION

Figure 1:
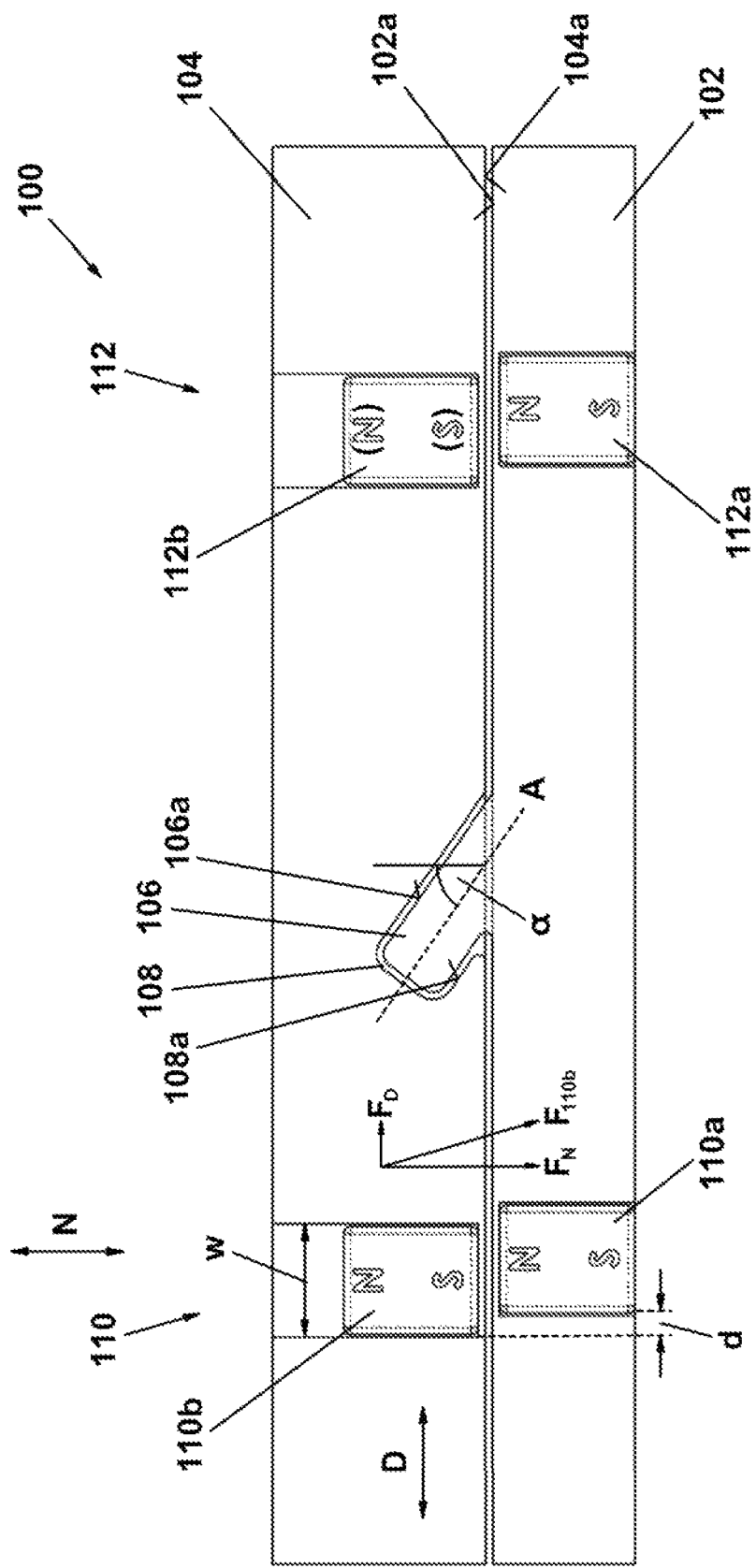

The present application is a Continuation of PCT/IB2020/060404 filed on Nov. 5, 2020, the entire contents of which are hereby incorporated herein by this reference.

The invention relates to a magnetic fastening device for releasably fastening a first unit and a second unit to each other, said first unit having a first unit abutment surface, and said second unit having a second unit abutment surface, said first unit abutment surface and said second unit abutment surface being adapted for abutment against each other, and said magnetic fastening device further comprising at least one pair of magnets, a first magnet of said pair of magnets being allocated to the first abutment surface, and a second magnet of said pair of magnets being allocated to the second abutment surface, said first magnet and said second magnet exerting an attractive force to each other.

Magnetic fastening devices of the afore-mentioned type are, for example, known from magnetic whiteboards. In this case, papers or foils may be fastened to a board (constituting the first unit) made from ferromagnetic material, e.g. a ferritic steel sheet, forming the actual whiteboard by using fastening elements (constituting the second unit) comprising permanent magnets. In this case, the first unit abutment surface and the second unit abutment surface are sandwiching the paper or foil between them when abutting against each other.

With this arrangement, on the one side, the papers or foils may easily be fastened to the whiteboard. On the other side, this type of magnetic fastening is susceptible to disturbance by external forces, in particular external forces exceeding the attractive magnetic forces acting between the magnets of the at least one pair of magnets.

In view of the above, it is the object of the present invention to further improve magnetic fastening devices of the afore-mentioned type.

According to the present invention, this object is solved by a magnetic fastening device of the afore-mentioned type, in which a first abutment surface of said first unit abutment surface and said second unit abutment surface is provided with at least one protrusion, in which a second abutment surface of said first unit abutment surface and said second unit abutment surface is provided with at least one recess, said at least one recess being adapted to receive said at least one protrusion, and in which said first magnet and said second magnet are displaced relative to each other by a displacement distance in a displacement direction extending parallel to the extension of said first abutment surface and said second abutment surface at the location of said protrusion and said recess such that, in a state in which said first abutment surface abuts against said second abutment surface and said at least one protrusion is received in said at least one recess, a component of said attractive force extending parallel to said first abutment surface and said second abutment surface maintains said at least one protrusion in said at least one recess.

According to the present invention, the magnetic fastening force is supplemented by a form fit between the at least one protrusion and the at least one recess. Preferably, the at least one protrusion and the at least one recess positively mate with each other when said first abutment surface and said second abutment surface abut against each other. As a consequence, if the magnetic fastening force of the at least one pair of magnets should be exceeded by an external force, the first and second units nevertheless remain fastened to each other due to the form fit. In addition, the magnetic fastening device according to the present invention provides for a synergistic effect between the magnetic fastening and the form fit fastening, as the attractive force between the first and second magnets maintains the form fit, in other words holds said at least one protrusion in said at least one recess.

In order to be able to provide for a mechanically stable connection, i.e. a connection substantially without play, it is further suggested that said at least one protrusion has a protrusion abutment surface, and said at least one recess has a recess abutment surface, and that said component of said attractive force pulls said protrusion abutment surface against said recess abutment surface.

According to a preferred embodiment, the at least one protrusion has the shape of a pin, a longitudinal axis of said pin extending obliquely with respect to said first abutment surface. Preferably, said longitudinal axis may enclose with a normal direction of said first abutment surface an angle different from 0°, preferably amounting to between about 30° and about 60°, more preferably amounting to about 45°. If the external forces have a main direction from which they are exerted on the fastening device, the longitudinal axis may be generally inclined towards or away from this main direction depending on which of the first and second units it is provided. In this way, the external forces may contribute to maintaining the form fit between the at least one protrusion and the at least one recess.

In order to provide a sufficiently strong attractive force between the magnets, it is advantageous that the displacement distance amounts to less than a width of at least one of said first magnet and said second magnet determined parallel to said displacement direction, preferably less than half of said width. This arrangement guarantees that the two magnets at least partially face each other.

Furthermore, at least one of the magnets, preferably both magnets, of the at least one pair of magnets may be arranged inside the corresponding first unit and/or the corresponding second unit and in close vicinity of the corresponding first unit abutment surface or second unit abutment surface, respectively. For aesthetical reasons, however, the at least one magnet may be covered by a thin layer of the material constituting a housing of the first unit and second unit, respectively.

Sufficiently strong magnetic forces may be achieved, for example, if at least one magnet of said pair of magnets is an active magnet, e.g. a permanent magnet or an electromagnet. Active magnets, in contrast to passive magnets, emit a magnetic field even when not being influenced by an external magnetic field.

According to an embodiment, a rear earth magnet, preferably a Samarium-Cobalt magnet, more preferably a Neodym-Samarium-Cobalt magnet may, for example, be used as a permanent magnet.

Although it is preferred, in particular in view of the strength of the magnetic forces, to have two active magnets, in particular two permanent magnets, it might be conceivable, in particular in order to reduce the costs of the magnetic fastening device, that one magnet of said pair of magnets is constituted by a passive magnet, e.g. an element at least partially made from a ferromagnetic or ferrimagnetic material and magnetized by the respective other magnet of said pair of magnets. Passive magnets, e.g. elements made from ferromagnetic or ferrimagnetic material, emit a magnetic field only when being magnetized by an active magnet.

A major advantage of the fastening device according to the present invention, resides in the fact that it is free of moving parts. As a consequence, for example, the first unit may be released from the second unit by simply gripping and removing it from the second unit in a direction extending oppositely to the engagement direction of the form fit. In particular in contrast to fastening devices involving a snap-lock connection, there is no need for depressing a tab and holding it depressed while removing the first unit from the second unit which considerably facilitates the releasing process.

According to a specific embodiment, said second unit may be constituted by a helmet, in particular motorcycle helmet, or a separate unit permanently fixed to said helmet. Many types of helmets, in particular protective helmets, are used across many different industries and sports. Among the most commonly used protective helmets are motorcycle helmets.

According to a further embodiment of the present invention, said first unit may include a functional device, for example a communication device, in particular a communication device using Bluetooth® technology. Such communication devices are well known in the art. The applicant is well-known as a manufacturer of such communication devices.

If it is required to establish an electrical connection between the functional unit and functional components of the helmet, e.g. microphones and/or loudspeakers, at least one electrical contact may be provided on at least one protrusion and in its corresponding recess. It is, however, also conceivable to provide at least one separate electrical connector at the first unit and the second unit.

In order to allow easy access to the functional device, it may preferably be disposed at a side surface of the helmet. In other words, said first abutment surface and said second abutment surface preferably may extend substantially parallel to a side surface of said helmet.

In this specific arrangement, the external forces jeopardizing the fastening of the first and second units mainly are forces caused by a forward movement of the wearer of the helmet, e.g. wind forces caused by a motorcycle ride or slapping forces caused by twigs of bushes and/or trees. As mentioned before, external forces having a main direction may be used for maintaining the form fit between the at least one protrusion and the at least one recess. Therefore, it is further suggested for a helmet, in particular a motorcycle helmet, that said displacement direction extends towards a front portion or a rear portion of said helmet depending on whether the protrusion is allocated to the helmet or the functional unit.

In addition to the form-fit of the at least one protrusion and the at least one recess, the magnetic fastening device according to the present invention may include at least one further mechanical locking unit, for example a turn and release locking unit and/or a lift and release locking unit and/or a safety catch locking unit and/or a latch type locking unit and/or a snap-lock unit including a catch, a trap and a release mechanism, e.g. a release button, for overriding the locking effect of catch and trap. In this context, the magnetic forces of the at least one pair of magnets helps avoiding detachment of the first unit from the second unit by mistake, in particular if the user unintentionally presses the release button of the further mechanical locking unit. This allows a two- or more-step release mechanism.

In the following, the invention will be described in more detail with respect to a specific embodiment referring to the enclosed drawings, in which:

FIG. 1 shows a cross-sectional view of a magnetic fastening device according to the invention; and FIG. 2 shows a perspective view of a motorcycle helmet having a communication device attached thereto using a magnetic fastening device according to the invention.

In FIG. 1 a magnetic fastening device is generally designated by reference numeral 100.

The magnetic fastening device 100 comprises a first unit 102 having a first unit abutment surface 102a and a second unit 104 having a second unit abutment surface 104a. In the fastened state of the magnetic fastening device 100 shown in FIG. 1, the first unit abutment surface 102a and the second unit abutment surface 104a are abutting against each other.

Furthermore, the first unit 102 comprises a protrusion 106 protruding from the first unit abutment surface 102a and, in the fastened state of the magnetic fastening device 100 shown in FIG. 1, engaging into a mating recess 108 provided in the second unit abutment surface 104a. Although FIG. 1 shows a small distance between a protrusion abutment surface 106a of the protrusion 106 and a recess abutment surface 108a of the recess 108, the protrusion 106 preferably tightly fits into the recess 108.

In the embodiment shown in FIG. 1, the protrusion 106 has the shape of a pin, the longitudinal axis A of which extends obliquely from said first abutment surface 102a, enclosing with a normal direction N extending orthogonal to the first unit abutment surface 102a and the second unit abutment surface 104a an angle α different from 0°. In the embodiment shown in FIG. 1, the angle α amounts to about 45°.

In the embodiment shown in FIG. 1, the magnetic fastening device 100 further comprises two pairs 110 and 112 of magnets 110a, 110b and 112a, 112b. A first magnet 110a, 112a of each pair 110, 112 is allocated to the first unit 102 while a second magnet 110b, 112b of each pair 110, 112 is allocated to the second unit 104. The first magnets 110a, 112a are located in close vicinity of the first unit abutment surface 102a, while the second magnets 110b, 112b are located in close vicinity of the second unit abutment surface 104a. Furthermore, the magnetic poles "N" and "S" of the magnets 110a, 110b and 112a, 112b of each pair 110, 112 are oriented in such a way that the magnets exert an attractive magnetic force onto each other.

As may be seen from FIG. 1, corresponding magnets 110a, 110b and 112a, 112b, when seen in normal direction N, are not in perfect alignment with each other. Rather, the respective first magnet 110a, 112a is displaced relative to the corresponding second magnet 110b, 112b by a displacement distance d in a displacement direction D extending parallel to the extension of said first abutment surface 102a and said second abutment surface 104a. As a consequence, a component FD of said attractive force (exemplarily shown for magnet 110b: attractive force $F_{110b}$) extending parallel to the displacement direction D maintains the protrusion 106 and recess 108 in engagement with each other.

As the displacement of the magnets 110a, 110b and 112a, 112b reduces the overall attractive force acting in normal direction N, the displacement distance d amounts to less the width w of the magnets.

Although in the embodiment of FIG. 1, the magnets 110a, 110b of the first pair 110 both are permanent magnets, i.e. active magnets, it is to be noted that it is also conceivable that one of the magnets may be a passive magnet, i.e. a magnet having a magnetic field only due to being magnetized by an active magnet. In FIG. 1, this is indicated for magnet 112b of the second pair 112, by putting the signs "N" and "S" for the magnetic poles in brackets.

One major advantage of the magnetic fastening device 100 according to the present invention is that it is free of any moving parts.

As may be seen from FIG. 2, the magnetic fastening device 100 according to the present invention may be used, for example, for fastening a communication unit 120, e.g. a Bluetooth® communication unit, to a motorcycle helmet 122, either indirectly using a tray 124 mounted at the helmet 122 or directly (not shown).

In this case, the communication device 120 is an element of the first unit 102. Furthermore, the helmet 122 (in the case of direct fastening to the helmet 122) or the tray 124 (in the case of indirect fastening) constitute or are part of the second unit 104 of the magnetic fastening device 100.

As may be seen from FIG. 2, the communication device 120 is fastened to a side surface 122a of the helmet 122, preferably in such a way that the wind forces exerted by the driving wind during a motorcycle ride support the maintenance of the form fit between protrusion 106 and recess 108.

In the embodiment of FIG. 2, the magnetic fastening device 100 includes four protrusions 106 and two magnets 110a, 112a (shown in dotted lines as covered by the plastics material of the tray 124). The corresponding recesses and other magnets are not shown in FIG. 2 as they are located at the lower side of the communication device 120. However, it should be noted that the afore-mentioned numbers are by no means intended to limit the scope of protection, and that a different number of protrusions and/or a different number of pairs of magnets may be used as well. Furthermore, the locations of the protrusions and/or magnets shown in FIG. 2 are merely intended as examples, but by no means limiting the scope of protection.

As a further option, an electric connector 126 intended for connecting at least one microphone (not shown) and at least one loudspeaker (not shown) implemented in the helmet 122 to the communication device 120 may be provided on the tray 124. As the connector 126 is merely an option, it is shown in dashed lines in FIG. 2.

Finally, it should be mentioned, that the tray 124 may be fixed to the helmet 122 by a clamp (not shown) which may permanently or releasably be fixed to the tray 124. It is, however, also conceivable to glue the tray 124 to the helmet 122, e.g. by using a strong double-sided tape.

With respect to the afore-given discussion of a specific embodiment of the invention, it is to be noted that neither the drawings nor the description thereof are intended to limit the scope of protection. For example, the protrusion may assume any suitable shape, e.g. the form of a thin and roundish pin or a rectangular protrusion or any other shape, as long as it fits into the recess.

The invention claimed is:

1. A magnetic fastening device for releasably fastening a first unit and a second unit to each other,
   the first unit having a first unit abutment surface, the second unit having a second unit abutment surface, the first unit abutment surface and the second unit abutment surface being adapted for abutment against each other,
   the magnetic fastening device comprising at least one pair of magnets, a first magnet of the at least one pair of magnets being allocated to the first abutment surface, and a second magnet of the at least one pair of magnets being allocated to the second abutment surface, the first magnet and the second magnet exerting an attractive force to each other,
   wherein a first abutment surface of the first unit abutment surface and the second unit abutment surface is provided with at least one protrusion,
   wherein a second abutment surface of the first unit abutment surface and the second unit abutment surface is provided with at least one recess, the at least one recess being adapted to receive the at least one protrusion, and
   wherein the first magnet and the second magnet are displaced relative to each other by a displacement distance in a displacement direction extending parallel to an extension of the first abutment surface and the second abutment surface at a location of the protrusion and the recess such that, in a state in which the first abutment surface abuts against the second abutment surface and the at least one protrusion is received in the at least one recess, a component of the attractive force extending parallel to the first abutment surface and the second abutment surface maintains said at least one protrusion in the at least one recess.

2. The magnetic fastening device of claim 1, wherein the at least one protrusion comprises a protrusion abutment surface, and the at least one recess comprises a recess abutment surface, and wherein the component of said attractive force pulls the protrusion abutment surface against the recess abutment surface.

3. The magnetic fastening device of claim 1, wherein at least one protrusion comprises a shape of a pin, a longitudinal axis of the pin extending obliquely with respect to the first abutment surface.

4. The magnetic fastening device of claim 3, wherein the longitudinal axis encloses, with a normal direction of the first abutment surface, an angle different from zero degrees (0°).

5. The magnetic fastening device of claim 1, wherein the displacement distance amounts to less than a width of at least one of the first magnet and the second magnet determined parallel to the displacement direction preferably less than half of said width.

6. The magnetic fastening device of claim 1, wherein at least one magnet of the pair of magnets is an active magnet.

7. The magnetic fastening device of claim 6, wherein one magnet of the pair of magnets comprises a passive magnet.

8. The magnetic fastening device of claim 1, wherein the magnetic fastening device is free of moving parts.

9. The magnetic fastening device of claim 1, wherein the second unit is a helmet, or a separate unit permanently fixed to the helmet.

10. The magnetic fastening device of claim 1, wherein the first unit comprises a functional device.

11. The magnetic fastening device of claim 9, wherein the first abutment surface and the second abutment surface extend substantially parallel to a side surface of the helmet.

12. The magnetic fastening device of claim 9, wherein the displacement direction extends towards a front portion or towards a rear portion of the helmet, wherein the displacement direction is determined based on whether the protrusion is allocated to the helmet or to the separate unit.

13. The magnetic fastening device of claim 1,
   wherein a cooperation of the at least one protrusion and the at least one recess comprises a mechanical locking unit, and wherein the magnetic fastening device includes at least one further mechanical locking unit.

14. The magnetic fastening device of claim 4, wherein the angle comprises an angle between thirty degrees (30°) and sixty degrees (60°).

15. The magnetic fastening device of claim 5, wherein the displacement distance amounts to less than half of the width.

16. The magnetic fastening device of claim 6, wherein the active magnet comprises a permanent magnet or an electromagnet.

17. The magnetic fastening device of claim 7, wherein the passive magnet comprises an element at least partly made from a ferromagnetic or ferrimagnetic material and magnetized by the respective other magnet of the pair of magnets.

18. The magnetic fastening device of claim 9, wherein the helmet comprises a motorcycle helmet.

19. The magnetic fastening device of claim 10, wherein the functional device comprises a communication device.

20. The magnetic fastening device of claim 19, wherein the communication device uses Bluetooth® technology.

\* \* \* \* \*